US011286958B2

(12) United States Patent
Le Doux, Jr. et al.

(10) Patent No.: US 11,286,958 B2
(45) Date of Patent: Mar. 29, 2022

(54) PISTONS FOR USE IN FLUID EXCHANGE DEVICES AND RELATED DEVICES, SYSTEMS, AND METHODS

(71) Applicant: Flowserve Management Company, Irving, TX (US)

(72) Inventors: Norman R. Le Doux, Jr., Orefield, PA (US); Jason Bandi, Irving, TX (US); Neil Havrilla, Coplay, PA (US); David Olexson, Irving, TX (US); Andreas Dreiss, Hamburg (DE)

(73) Assignee: Flowserve Management Company, Irving, TX (US)

( * ) Notice: Subject to any disclaimer, the term of this patent is extended or adjusted under 35 U.S.C. 154(b) by 141 days.

(21) Appl. No.: 16/679,037

(22) Filed: Nov. 8, 2019

(65) Prior Publication Data

US 2020/0149557 A1 May 14, 2020

Related U.S. Application Data

(60) Provisional application No. 62/758,373, filed on Nov. 9, 2018.

(51) Int. Cl.
 *F04F 13/00* (2009.01)
 *F16K 31/08* (2006.01)
 *F16K 11/07* (2006.01)
 *F15B 3/00* (2006.01)

(52) U.S. Cl.
 CPC ......... *F04F 13/00* (2013.01); *F16K 11/0716* (2013.01); *F16K 31/084* (2013.01); *F15B 3/00* (2013.01)

(58) Field of Classification Search
 CPC . F04F 7/02; F04F 13/00; F04B 7/0208; F04B 53/128
 See application file for complete search history.

(56) References Cited

U.S. PATENT DOCUMENTS

| | | | |
|---|---|---|---|
| 1,577,242 A | 3/1926 | Andersen | |
| 1,647,189 A | 11/1927 | Mueller et al. | |
| 1,647,734 A | 11/1927 | Kelly | |
| 1,769,672 A | 7/1930 | Blair | |
| 1,970,591 A * | 8/1934 | Barks | F04B 53/121 184/7.2 |
| 2,365,046 A | 12/1944 | Bottomley | |

(Continued)

FOREIGN PATENT DOCUMENTS

| | | |
|---|---|---|
| CN | 101705930 B | 2/2012 |
| CN | 102421513 A | 4/2012 |

(Continued)

OTHER PUBLICATIONS

Vorteq Pure Grit, This changes everything, Brochure, Energy Recovery Inc, 8 pages.

(Continued)

*Primary Examiner* — Reinaldo Sanchez-Medina
*Assistant Examiner* — Nicole Gardner
(74) *Attorney, Agent, or Firm* — Phillips Winchester (57) ABSTRACT

Pistons and related methods may be configured to separate fluids and to at least partially prohibit one fluid from traveling to one side of the piston from another side of the piston. Pressure exchange devices and systems may include such pistons.

19 Claims, 4 Drawing Sheets

(56) References Cited

U.S. PATENT DOCUMENTS

| | | |
|---|---|---|
| 2,600,836 A | 6/1952 | Boyd |
| 2,615,465 A | 10/1952 | Woodward |
| 3,089,504 A | 5/1963 | Crawford |
| 3,223,173 A | 12/1965 | Paul, Jr. |
| 3,347,554 A | 10/1967 | Jagger et al. |
| 3,570,510 A | 3/1971 | Tsutsumi |
| 3,583,606 A | 6/1971 | Ewald |
| 3,595,265 A | 7/1971 | Cryder et al. |
| 3,612,361 A | 10/1971 | Ewald et al. |
| 3,661,167 A | 5/1972 | Hussey |
| 3,661,400 A | 5/1972 | Weinand |
| 3,675,825 A | 7/1972 | Morane |
| 3,675,935 A | 7/1972 | Ludwig et al. |
| 3,741,243 A | 6/1973 | Deibler et al. |
| 3,749,291 A | 7/1973 | Prussin et al. |
| 3,756,273 A | 9/1973 | Hengesbach |
| 3,776,278 A | 12/1973 | Allen |
| 4,024,891 A | 5/1977 | Engel et al. |
| 4,123,332 A | 10/1978 | Rotter |
| 4,133,346 A | 1/1979 | Smith et al. |
| 4,134,454 A | 1/1979 | Faylor |
| 4,176,063 A | 11/1979 | Tyler |
| 4,234,010 A | 11/1980 | Jenkins et al. |
| 4,236,547 A | 12/1980 | Harasewych |
| 4,244,555 A | 1/1981 | Maggioni et al. |
| 4,249,868 A * | 2/1981 | Kotyk .................. F04B 19/022 417/457 |
| 4,308,103 A | 12/1981 | Rotter |
| 4,321,021 A | 3/1982 | Pauliukonis |
| 4,350,176 A | 9/1982 | Lace |
| 4,412,632 A | 11/1983 | Berger et al. |
| 4,424,917 A | 1/1984 | Berger et al. |
| 4,479,356 A | 10/1984 | Gill |
| 4,510,963 A | 4/1985 | Presley et al. |
| 4,518,006 A | 5/1985 | Hoffmann et al. |
| 4,566,485 A * | 1/1986 | Ruble .................... F04B 15/04 137/375 |
| 4,570,853 A | 2/1986 | Schmied |
| 4,579,511 A | 4/1986 | Burns |
| 4,586,692 A | 5/1986 | Stephens |
| 4,627,461 A | 12/1986 | Gordon |
| 4,726,530 A | 2/1988 | Miller et al. |
| 4,768,542 A | 9/1988 | Morris |
| 4,834,193 A | 5/1989 | Leitko et al. |
| 4,999,872 A | 3/1991 | Jentsch |
| 5,033,557 A | 7/1991 | Askew |
| 5,070,817 A | 12/1991 | Momont |
| 5,172,918 A | 12/1992 | Pecht et al. |
| 5,232,013 A | 8/1993 | Morris |
| 5,234,031 A | 8/1993 | Pickett et al. |
| 5,240,036 A | 8/1993 | Morris |
| 5,299,859 A | 4/1994 | Tackett et al. |
| 5,300,041 A | 4/1994 | Haber et al. |
| 5,357,995 A | 10/1994 | King et al. |
| 5,797,429 A | 8/1998 | Shumway |
| 5,951,169 A | 9/1999 | Oklejas et al. |
| 5,992,289 A | 11/1999 | George et al. |
| 6,036,435 A | 3/2000 | Oklejas |
| 6,126,418 A | 10/2000 | Sinnl |
| 6,293,245 B1 | 9/2001 | Bock |
| RE37,921 E | 12/2002 | Martin et al. |
| 6,516,897 B2 | 2/2003 | Thompson |
| 6,540,487 B2 | 4/2003 | Polizos et al. |
| 6,607,368 B1 | 8/2003 | Ross et al. |
| 6,647,938 B2 | 11/2003 | Gaessler et al. |
| 6,659,731 B1 | 12/2003 | Hauge |
| 7,128,084 B2 | 10/2006 | Long et al. |
| 7,201,557 B2 | 4/2007 | Stover |
| 7,306,437 B2 | 12/2007 | Hauge |
| 7,474,013 B2 | 1/2009 | Greenspan et al. |
| 7,670,482 B2 | 3/2010 | Wietham |
| 7,871,522 B2 | 1/2011 | Stover et al. |
| RE42,432 E | 6/2011 | Stover |
| 7,997,853 B2 | 8/2011 | Pique et al. |
| 8,075,281 B2 | 12/2011 | Martin et al. |
| 8,297,303 B2 | 10/2012 | Desantis et al. |
| 8,360,250 B2 | 1/2013 | Nguyen et al. |
| 8,465,000 B2 | 6/2013 | Bartell et al. |
| 8,579,603 B2 | 11/2013 | Oklejas et al. |
| 8,603,218 B2 | 12/2013 | Montie et al. |
| 8,622,714 B2 | 1/2014 | Andrews |
| 9,108,162 B2 | 8/2015 | Takahashi et al. |
| 9,163,737 B2 | 10/2015 | Andersson |
| 9,328,743 B2 | 5/2016 | Hirosawa et al. |
| 9,435,354 B2 | 9/2016 | Lehner et al. |
| 9,440,895 B2 | 9/2016 | Arluck et al. |
| 9,500,394 B2 | 11/2016 | Aniello |
| 9,523,261 B2 | 12/2016 | Flores et al. |
| 9,546,671 B2 | 1/2017 | Hirosawa et al. |
| 9,556,736 B2 | 1/2017 | Sigurdsson |
| 9,587,752 B2 | 3/2017 | Montague |
| 9,604,889 B2 | 3/2017 | Arluck et al. |
| 9,611,948 B1 | 4/2017 | Andersson |
| 9,683,574 B2 | 6/2017 | Winkler et al. |
| 9,695,795 B2 | 7/2017 | Martin et al. |
| 9,739,128 B2 | 8/2017 | Ghasripoor et al. |
| 9,739,275 B2 | 8/2017 | Robison et al. |
| 9,759,054 B2 | 9/2017 | Gay et al. |
| 9,764,272 B2 | 9/2017 | Martin et al. |
| 9,835,018 B2 | 12/2017 | Krish et al. |
| 9,885,372 B2 | 2/2018 | Arluck et al. |
| 9,920,774 B2 | 3/2018 | Ghasripoor et al. |
| 9,945,210 B2 | 4/2018 | Theodossiou |
| 9,945,216 B2 | 4/2018 | Ghasripoor et al. |
| 9,970,281 B2 | 5/2018 | Ghasripoor et al. |
| 9,975,789 B2 | 5/2018 | Ghasripoor et al. |
| 9,976,573 B2 | 5/2018 | Martin et al. |
| 10,001,030 B2 | 6/2018 | Krish et al. |
| 10,006,524 B2 | 6/2018 | Crump et al. |
| 10,024,496 B2 | 7/2018 | Hauge |
| 10,030,372 B2 | 7/2018 | Di Monte, Sr. |
| 10,072,675 B2 | 9/2018 | McLean et al. |
| 10,119,379 B2 | 11/2018 | Richter et al. |
| 10,125,796 B2 | 11/2018 | Hauge |
| 10,138,907 B2 | 11/2018 | Pinto et al. |
| 10,167,710 B2 | 1/2019 | Ghasripoor et al. |
| 10,167,712 B2 | 1/2019 | Ghasripoor et al. |
| 2002/0025264 A1 | 2/2002 | Polizos et al. |
| 2004/0118462 A1 | 6/2004 | Baumann |
| 2005/0103386 A1 | 5/2005 | Magda |
| 2005/0166978 A1* | 8/2005 | Brueckmann .......... B01D 61/06 137/625.43 |
| 2006/0145426 A1 | 7/2006 | Schroeder et al. |
| 2006/0196474 A1 | 9/2006 | Magel |
| 2006/0231577 A1 | 10/2006 | Powling et al. |
| 2007/0204916 A1 | 9/2007 | Clayton et al. |
| 2009/0057084 A1 | 3/2009 | Mahawili |
| 2009/0104046 A1 | 4/2009 | Martin et al. |
| 2009/0313737 A1 | 12/2009 | Richard |
| 2012/0024249 A1 | 2/2012 | Fuhrmann et al. |
| 2012/0061595 A1* | 3/2012 | Canjuga ................ F16K 1/126 251/62 |
| 2012/0067825 A1 | 3/2012 | Pique et al. |
| 2014/0026608 A1 | 1/2014 | Manzo et al. |
| 2014/0048143 A1 | 2/2014 | Lehner et al. |
| 2014/0284058 A1 | 9/2014 | Watson et al. |
| 2015/0130142 A1 | 5/2015 | Zheng et al. |
| 2015/0184540 A1 | 7/2015 | Winkler et al. |
| 2015/0292310 A1 | 10/2015 | Ghasripoor et al. |
| 2016/0032691 A1 | 2/2016 | Richter et al. |
| 2016/0032702 A1 | 2/2016 | Gay et al. |
| 2016/0039054 A1 | 2/2016 | Ghasripoor et al. |
| 2016/0062370 A1 | 3/2016 | Gaines-Germain et al. |
| 2016/0101307 A1 | 4/2016 | Montague |
| 2016/0102536 A1 | 4/2016 | Knoeller |
| 2016/0138649 A1 | 5/2016 | Anderson et al. |
| 2016/0146229 A1 | 5/2016 | Martin et al. |
| 2016/0153551 A1 | 6/2016 | Schiele et al. |
| 2016/0160849 A1 | 6/2016 | Gains-Germain et al. |
| 2016/0160881 A1 | 6/2016 | Anderson et al. |
| 2016/0160882 A1 | 6/2016 | Morphew |
| 2016/0160887 A1 | 6/2016 | Anderson |
| 2016/0160888 A1 | 6/2016 | Morphew |
| 2016/0160889 A1 | 6/2016 | Hoffman et al. |

(56) References Cited

U.S. PATENT DOCUMENTS

| | | |
|---|---|---|
| 2016/0160890 A1 | 6/2016 | Anderson |
| 2016/0160917 A1 | 6/2016 | Deshpande |
| 2016/0377096 A1 | 12/2016 | Lehner et al. |
| 2017/0108131 A1 | 4/2017 | Andersson |
| 2017/0130743 A1 | 5/2017 | Anderson |
| 2017/0254474 A1 | 9/2017 | Sauer |
| 2017/0306986 A1 | 10/2017 | McLean et al. |
| 2017/0306987 A1 | 10/2017 | Theodossiou |
| 2017/0350428 A1 | 12/2017 | Martin et al. |
| 2017/0370500 A1 | 12/2017 | Haines et al. |
| 2018/0056211 A1 | 3/2018 | Seabrook et al. |
| 2018/0087364 A1 | 3/2018 | Krish et al. |
| 2018/0094648 A1 | 4/2018 | Hoffman et al. |
| 2018/0120197 A1 | 5/2018 | Di Monte |
| 2018/0195370 A1 | 7/2018 | Theodossiou |
| 2018/0209254 A1 | 7/2018 | Ghasripoor et al. |
| 2018/0252239 A1 | 9/2018 | Martin et al. |
| 2018/0306672 A1 | 10/2018 | Pattom et al. |
| 2018/0347601 A1 | 12/2018 | Hoffman et al. |
| 2019/0071340 A1 | 3/2019 | Imrie |
| 2020/0149362 A1 | 5/2020 | Terwilliger et al. |
| 2020/0149380 A1 | 5/2020 | Procita et al. |
| 2020/0149556 A1 | 5/2020 | Judge et al. |
| 2020/0149657 A1 | 5/2020 | Christian et al. |
| 2020/0150698 A1 | 5/2020 | Judge et al. |

FOREIGN PATENT DOCUMENTS

| | | |
|---|---|---|
| CN | 206158951 U | 5/2017 |
| EP | 0163897 B1 | 7/1988 |
| EP | 1486706 A1 | 12/2004 |
| EP | 1948942 B1 | 4/2009 |
| EP | 3177429 A1 | 6/2017 |
| GB | 0946494 A | 1/1964 |
| JP | 6386657 B2 | 9/2018 |
| NZ | 503937 A | 6/2002 |
| RU | 2284423 C1 | 9/2006 |
| RU | 2010145595 A | 5/2012 |
| RU | 2511638 C2 | 4/2014 |
| SG | 151056 A1 | 5/2009 |
| SU | 10161 A1 | 6/1929 |
| WO | 02/66816 A1 | 8/2002 |
| WO | 2010/031162 A9 | 11/2010 |
| WO | 2016/022706 A1 | 2/2016 |
| WO | 2016/063194 A3 | 7/2016 |
| WO | 2017/083500 A1 | 5/2017 |
| WO | 2018/035201 A1 | 2/2018 |
| WO | 2018/085740 A2 | 5/2018 |

OTHER PUBLICATIONS

PCT International Patent Application No. PCT/US2019/060621, International Search Report dated Mar. 19, 2020, 2 pp.

PCT International Patent Application No. PCT/US2019/060621, Written Opinion dated Mar. 19, 2020, 5 pp.

* cited by examiner

PISTONS FOR USE IN FLUID EXCHANGE DEVICES AND RELATED DEVICES, SYSTEMS, AND METHODS

CROSS-REFERENCE TO RELATED APPLICATION

This application claims the benefit under 35 U.S.C. § 119(e) of U.S. Provisional Patent Application Ser. No. 62/758,373, filed Nov. 9, 2018, for "Fluid Exchange Devices and Related Controls, Systems, and Methods," the disclosure of which is hereby incorporated herein in its entirety by this reference.

TECHNICAL FIELD

The present disclosure relates generally to pistons for exchange devices. More particularly, embodiments of the present disclosure relate to pistons for use in fluid exchange devices for one or more of exchanging properties (e.g., pressure) between fluids and systems and methods.

BACKGROUND

Industrial processes often involve hydraulic systems including pumps, valves, impellers, etc. Pumps, valves, and impellers may be used to control the flow of the fluids used in the hydraulic processes. For example, some pumps may be used to increase (e.g., boost) the pressure in the hydraulic system, other pumps may be used to move the fluids from one location to another. Some hydraulic systems include valves to control where a fluid flows. Valves may include control valves, ball valves, gate valves, globe valves, check valves, isolation valves, combinations thereof, etc.

Some industrial processes involve the use of caustic fluids, abrasive fluids, and/or acidic fluids. These types of fluids may increase the amount of wear on the components of a hydraulic system. The increased wear may result in increased maintenance and repair costs or require the early replacement of equipment. For example, abrasive, caustic, or acidic fluid may increase the wear on the internal components of a pump such as an impeller, shaft, vanes, nozzles, etc. Some pumps are rebuildable and an operation may choose to rebuild a worn pump replacing the worn parts which may result in extended periods of downtime for the worn pump resulting in either the need for redundant pumps or a drop in productivity. Other operations may replace worn pumps at a larger expense but a reduced amount of downtime.

Well completion operations in the oil and gas industry often involve hydraulic fracturing (often referred to as fracking or fracing) to increase the release of oil and gas in rock formations. Hydraulic fracturing involves pumping a fluid (e.g., frac fluid, fracking fluid, etc.) containing a combination of water, chemicals, and proppant (e.g., sand, ceramics) into a well at high pressures. The high pressures of the fluid increases crack size and crack propagation through the rock formation releasing more oil and gas, while the proppant prevents the cracks from closing once the fluid is depressurized. Fracturing operations use high-pressure pumps to increase the pressure of the fracking fluid. However, the proppant in the fracking fluid increases wear and maintenance on and substantially reduces the operation lifespan of the high-pressure pumps due to its abrasive nature.

BRIEF SUMMARY

Various embodiments may include a device or system for exchanging pressure between fluids. The device may include at least one tank, at least one piston in the at least one tank, and a valve device. The tank may include a clean side for receiving a clean fluid at a higher pressure and a dirty side for receiving a downhole fluid (e.g., a fracking fluid, a drilling fluid) at a lower pressure. The piston may be configured to separate the clean fluid from the downhole fluid to at least partially prohibit fluid the downhole fluid from traveling from the dirty side to the clean side. The valve device may be configured to selectively place the clean fluid at the higher pressure in communication with the downhole fluid at the lower pressure through the piston to pressurize the downhole fluid to a second higher pressure.

Another embodiment may include a device or system for exchanging at least one property between fluids. The device may include at least one tank, at least one piston in the at least one tank, and a valve device. The tank may include a first end for receiving a first fluid (e.g., a clean fluid) with a first property and a second end for receiving a second fluid (e.g., a dirty fluid) with a second property. The piston may be configured to separate the clean fluid from the dirty fluid and to substantially prohibit fluid the dirty fluid from traveling from the second side to the first side.

Another embodiment may include a piston for at least partially separating at least two fluid streams. The piston may be implemented in the devices or systems discussed above. The piston includes a body having an opening extending along an axis of the body where the opening defines a fluid pathway through the piston, and at least one valve obstructing the opening. The at least one valve is configured to enable fluid flow in one direction along the fluid pathway through the opening and to at least partially inhibit fluid flow in another, opposing direction along the fluid pathway through the opening.

Another embodiment may include a method of operating a pressure exchange device comprising supplying a high pressure fluid to a high pressure inlet of a valve configured to direct flow of the high pressure fluid to a chamber; transferring a pressure from the high pressure fluid to a dirty fluid through a piston in the chamber; enabling some of the high pressure fluid to pass through the piston; and substantially prohibiting the dirty fluid from passing through the piston to the high pressure fluid.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not meant to be actual views of any particular fluid exchanger or component thereof, but are merely idealized representations employed to describe illustrative embodiments. The drawings are not necessarily to scale. Elements common between figures may retain the same numerical designation.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material. In some embodiments, fluids may convert between a liquid form and a gaseous form during a cooling or heating process as described herein. In some embodiments, the term fluid includes gases, liquids, and/or pumpable mixtures of liquids and solids.

Embodiments of the present disclosure may relate to exchange devices that may be utilized to exchange one or more properties between fluids (e.g., a pressure exchanger). Such exchangers (e.g., pressure exchangers) are sometimes called "flow-work exchangers" or "isobaric devices" and are machines for exchanging pressure energy from a relatively high-pressure flowing fluid system to a relatively low-pressure flowing fluid system.

In some industrial processes, elevated pressures are required in certain parts of the operation to achieve the desired results, following which the pressurized fluid is depressurized. In other processes, some fluids used in the process are available at high-pressures and others at low-pressures, and it is desirable to exchange pressure energy between these two fluids. As a result, in some applications, great improvement in economy can be realized if pressure can be efficiently transferred between two fluids.

In some embodiments, exchangers as disclosed herein may be similar to and include the various components and configurations of the pressure exchangers disclosed in U.S. Pat. No. 5,797,429 to Shumway, issued Aug. 25, 1998, the disclosure of which is hereby incorporated herein in its entirety by this reference.

Although some embodiments of the present disclosure are depicted as being used and employed as a pressure exchanger between two or more fluids, persons of ordinary skill in the art will understand that the embodiments of the present disclosure may be employed in other implementations such as, for example, the exchange of other properties (e.g., temperature, density, etc.) and/or composition between one or more fluids and/or mixing of two or more fluids.

In some embodiments, a pressure exchanger may be used to protect moving components (e.g., pumps, valves, impellers, etc.) in processes were high pressures are needed in a fluid that has the potential to damage the moving components (e.g., abrasive fluid, caustic fluid, acidic fluid, etc.).

For example, pressure exchange devices according to embodiments of the disclosure may be implemented in hydrocarbon related processes, such as, hydraulic fracturing or other drilling operations (e.g., subterranean downhole drilling operations).

As discussed above, well completion operations in the oil and gas industry often involve hydraulic fracturing, drilling operations, or other downhole operations that use high-pressure pumps to increase the pressure of the downhole fluid (e.g., fluid that is intended to be conducted into a subterranean formation or borehole, such as, fracking fluid, drilling fluid, drilling mud). The proppants, chemicals, additives to produce mud, etc. in these fluids often increase wear and maintenance on the high-pressure pumps.

In some embodiments, a hydraulic fracturing system may include a hydraulic energy transfer system that transfers pressure between a first fluid (e.g., a clean fluid, such as a partially (e.g., majority) or substantially proppant free fluid or a pressure exchange fluid) and a second fluid (e.g., fracking fluid, such as a proppant-laden fluid, an abrasive fluid, or a dirty fluid). Such systems may at least partially (e.g., substantially, primarily, entirely) isolate the high-pressure first fluid from the second dirty fluid while still enabling the pressurizing of the second dirty fluid with the high-pressure first fluid and without having to pass the second dirty fluid directly through a pump or other pressurizing device.

While some embodiments discussed herein may be directed to fracking operations, in additional embodiments, the exchanger systems and devices disclosed herein may be utilized in other operations. For example, devices, systems, and/or method disclosed herein may be used in other downhole operations, such as, for example, downhole drilling operations. Further, embodiments of the pistons disclosed herein may be implemented in any other suitable fluid-handling application.

Figure 1:
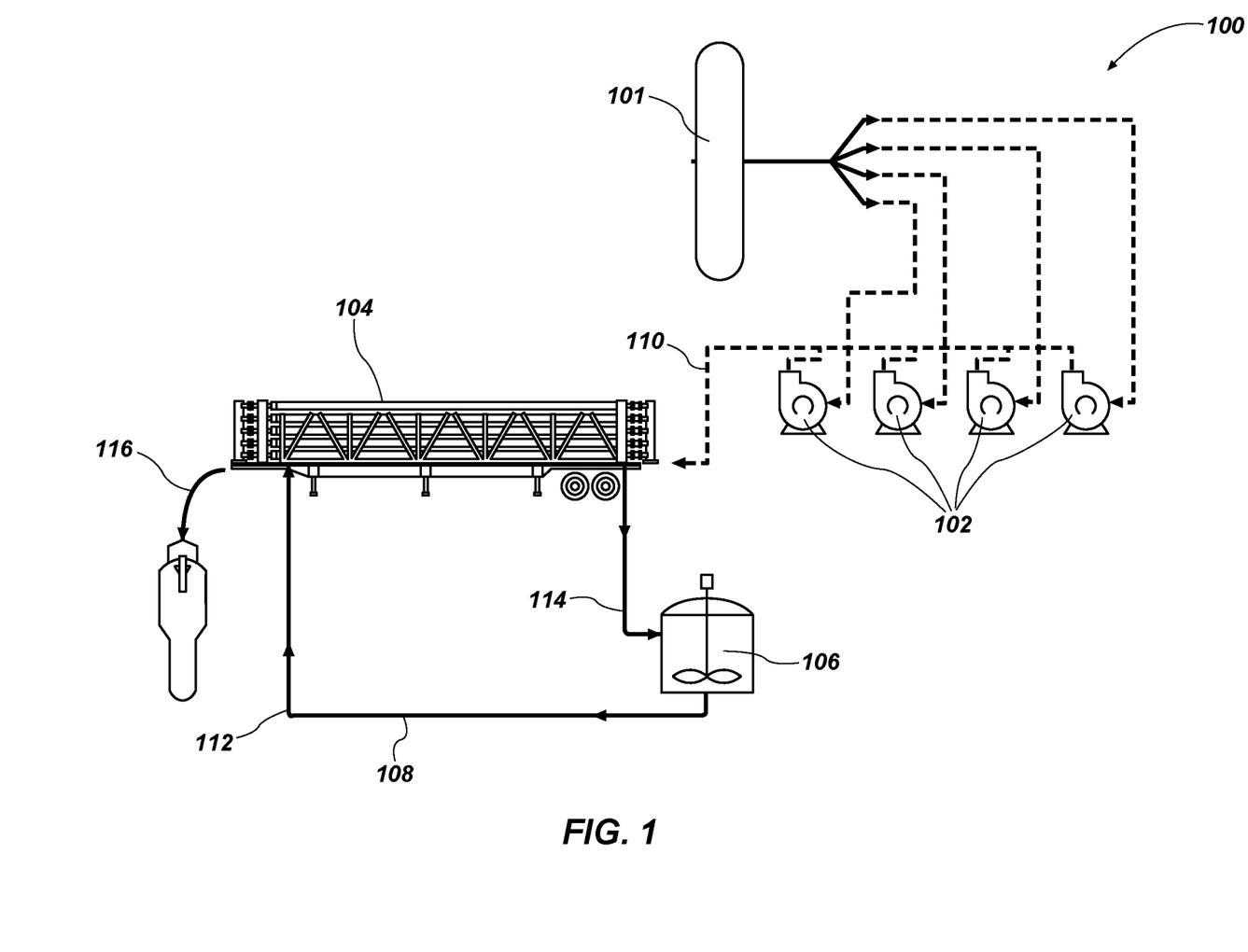
FIG. 1 is schematic view of a hydraulic fracturing system according to an embodiment of the present disclosure.

FIG. 1 illustrates a system diagram of an embodiment of hydraulic fracturing system 100 utilizing a pressure exchanger between a first fluid stream (e.g., clean fluid stream) and a second fluid stream (e.g., a fracking fluid stream). Although not explicitly described, it should be understood that each component of the system 100 may be directly connected or coupled via a fluid conduit (e.g., pipe) to an adjacent (e.g., upstream or downstream) component. The hydraulic fracturing system 100 may include one or more devices for pressurizing the first fluid stream, such as, for example, frack pumps 102 (e.g., reciprocating pumps, centrifugal pumps, scroll pumps, etc.). The system 100 may include multiple frack pumps 102, such as at least two frack pumps 102, at least four frack pumps 102, at least ten frack pumps 102, at least sixteen frack pumps, or at least twenty frack pumps 102. In some embodiments, the frack pumps 102 may provide relatively and substantially clean fluid at a high pressure to a pressure exchanger 104 from a fluid source 101. In some embodiments, fluid may be provided separately to each pump 102 (e.g., in a parallel configuration). After pressurization in the pumps 102, the high pressure clean fluid 110 may be combined and transmitted to the pressure exchanger 104 (e.g., in a serial configuration).

As used herein, "clean" fluid may describe fluid that is at least partially or substantially free (e.g., substantially entirely or entirely free) of chemicals and/or proppants typically found in a downhole fluid and "dirty" fluid may describe fluid that at least partially contains chemicals, other additives and/or proppants typically found in a downhole fluid.

The pressure exchanger 104 may transmit the pressure from the high pressure clean fluid 110 to a low pressure fracking fluid (e.g., fracking fluid 112) in order to provide a high pressure fracking fluid 116. The clean fluid may be expelled from the pressure exchanger 104 as a low pressure fluid 114 after the pressure is transmitted to the low pressure fracking fluid 112. In some embodiments, the low pressure fluid 114 may be an at least partially or substantially clean fluid that substantially lacks chemicals and/or proppants aside from a small amount that may be passed to the low pressure fluid 114 from the fracking fluid 112 in the pressure exchanger 104.

In some embodiments, the pressure exchanger 104 may include one or more pressure exchanger devices (e.g., operating in parallel). In such configurations, the high pressure inputs may be separated and provided to inputs of each of the pressure exchanger devices. The outputs of each of the pressure exchanger devices may be combined as the high pressure fracking fluid exits the pressure exchanger 104. For example, and as discussed below with reference to FIG. 4, the pressure exchanger 104 may include two or more (e.g., three) pressure exchanger devices operating in parallel. As depicted, the pressure exchanger 104 may be provided on a mobile platform (e.g., a truck trailer) that may be relatively easily installed and removed from a fracking well site.

After being expelled from the pressure exchanger 104, the low pressure clean fluid 114 may travel to and be collected in a mixing chamber 106 (e.g., blender unit, mixing unit, etc.). In some embodiments, the low pressure fluid 114 may be converted (e.g., modified, transformed, etc.) to the low pressure fracking fluid 112 in the mixing chamber 106. For example, a proppant may be added to the low pressure clean fluid 114 in the mixing chamber 106 creating a low pressure fracking fluid 112. In some embodiments, the low pressure clean fluid 114 may be expelled as waste.

In many hydraulic fracturing operations, a separate process may be used to heat the fracking fluid 112 before the fracking fluid 112 is discharged downhole (e.g., to ensure proper blending of the proppants in the fracking fluid). In some embodiments, using the low pressure clean fluid 114 to produce the fracking fluid 112 may eliminate the step of heating the fracking fluid. For example, the low pressure clean fluid 114 may be at an already elevated temperature as a result of the fracking pumps 102 pressurizing the high pressure clean fluid 110. After transferring the pressure in the high pressure clean fluid 110 that has been heated by the pumps 102, the now low pressure clean fluid 114 retains at least some of that heat energy as it is passed out of the pressure exchanger 104 to the mixing chamber 106. In some embodiments, using the low pressure clean fluid 114 at an already elevated temperature to produce the fracking fluid may result in the elimination of the heating step for the fracking fluid. In other embodiments, the elevated temperature of the low pressure clean fluid 114 may result in a reduction of the amount of heating required for the fracking fluid.

After the proppant is added to the low pressure fluid 114, now fracking fluid, the low pressure fracking fluid 112 may be expelled from the mixing chamber 106. The low pressure fracking fluid 112 may then enter the pressure exchanger 104 on the fracking fluid end through a fluid conduit 108 connected (e.g., coupled) between the mixing chamber 106 and the pressure exchanger 104. Once in the pressure exchanger 104, the low pressure fracking fluid 112 may be pressurized by the transmission of pressure from the high pressure clean fluid 110 through the pressure exchanger 104. The high pressure fracking fluid 116 may then exit the pressure exchanger 104 and be transmitted downhole.

Hydraulic fracturing systems generally require high operating pressures for the high pressure fracking fluid 116. In some embodiments, the desired pressure for the high pressure fracking fluid 116 may be between about 8,000 PSI (55,158 kPa) and about 12,000 PSI (82,737 kPa), such as between about 9,000 PSI (62,052 kPa) and about 11,000 PSI (75,842 kPa), or about 10,000 PSI (68,947 kPa).

In some embodiments, the high pressure clean fluid 110 may be pressurized to a pressure at least substantially the same or slightly greater than the desired pressure for the high pressure fracking fluid 116. For example, the high pressure clean fluid 110 may be pressurized to between about 0 PSI (0 kPa) and about 1000 PSI (6,894 kPa) greater than the desired pressure for the high pressure fracking fluid 116, such as between about 200 PSI (1,379 kPa) and about 700 PSI (4,826 kPa) greater than the desired pressure, or between about 400 PSI (2,758 kPa) and about 600 PSI (4,137 kPa) greater than the desired pressure, to account for any pressure loss during the pressure and exchange process.

Figure 2:
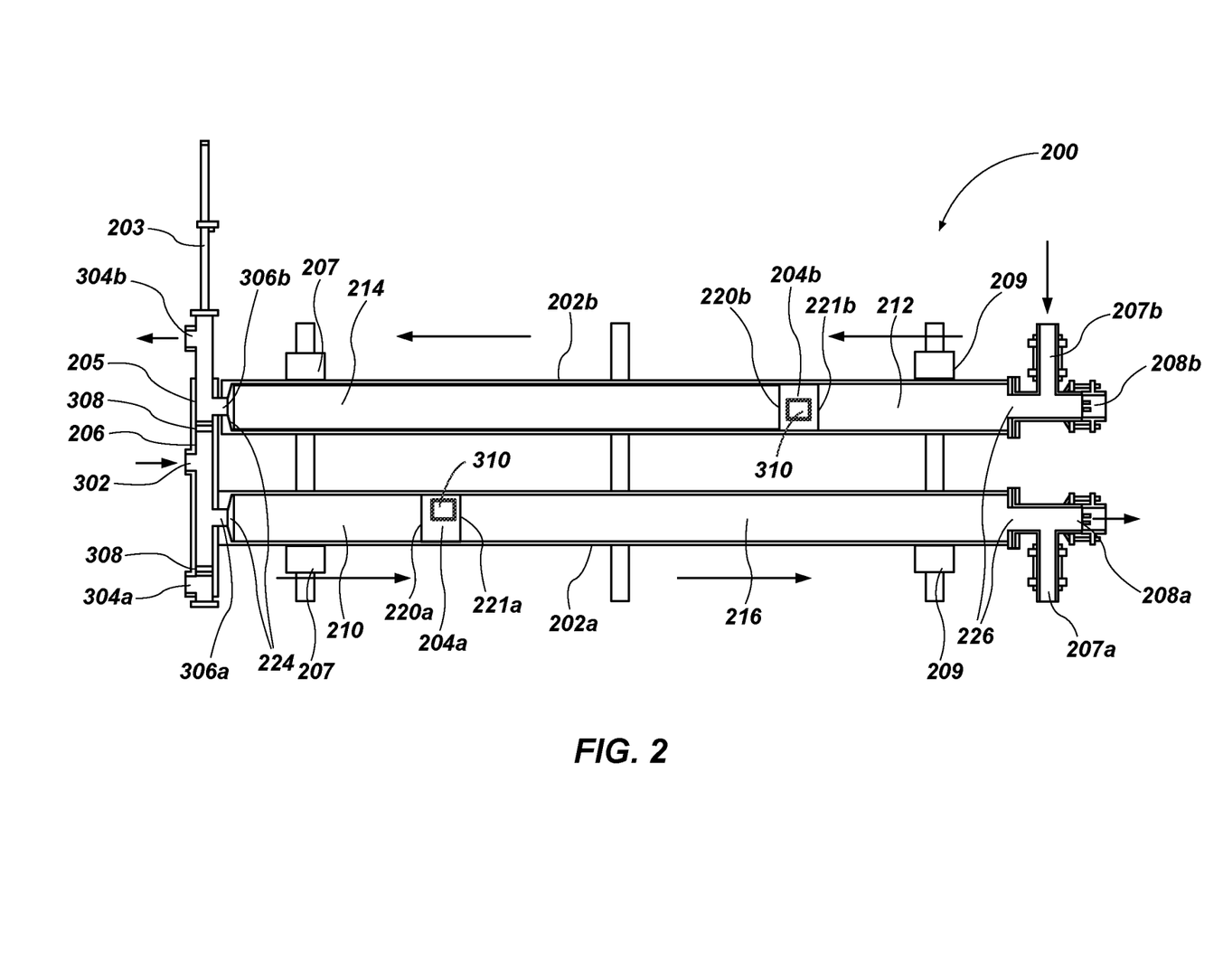
FIG. 2 is cross-sectional view of a fluid exchanger device according to an embodiment of the present disclosure.

FIG. 2 illustrates an embodiment of a pressure exchanger 200. The pressure exchanger 200 may be a linear pressure exchanger in the sense that it is operated by moving or translating an actuation assembly substantially along a linear path. For example, the actuation assembly may be moved linearly to selectively place the low and high pressure fluids in at least partial communication (e.g., indirect communication where the pressure of the high pressure fluid may be transferred to the low pressure fluid) as discussed below in greater detail.

The linear pressure exchanger 200 may include one or more (e.g., two) chambers 202a, 202b (e.g., tanks, collectors, cylinders, tubes, pipes, etc.). The chambers 202a, 202b (e.g., parallel chambers 202a, 202b) may include pistons 204a, 204b configured to substantially maintain the high pressure clean fluid 210 and low pressure clean fluid 214 (e.g., the clean side) separate from the high pressure dirty fluid 216 and the low pressure dirty fluid 212 (e.g., the dirty side) while enabling transfer of pressure between the respective fluids 210, 212, 214, and 216. The pistons 204a, 204b may be sized (e.g., the outer diameter of the pistons 204a, 204b relative to the inner diameter of the chambers 202a, 202b) to enable the pistons 204a, 204b to travel through the chamber 202a, 202b while minimizing fluid flow around the pistons 204a, 204b.

The linear pressure exchanger 200 may include a clean control valve 206 configured to control the flow of high pressure clean fluid 210 and low pressure clean fluid 214. Each of the chambers 202a, 202b may include one or more dirty control valves 207a, 207b, 208a, and 208b configured to control the flow of the low pressure dirty fluid 212 and the high pressure dirty fluid 216.

While the embodiment of FIG. 2 contemplates a linear pressure exchanger 200, other embodiments, may include other types of pressure exchangers that involve other mechanisms for selectively placing the low and high pressure fluids in at least partial communication (e.g., a rotary actuator such as those disclosed in U.S. Pat. No. 9,435,354, issued Sep. 6, 2016, the disclosure of which is hereby incorporated herein in its entirety by this reference, etc.).

In some embodiments, the clean control valve 206, which includes an actuation stem 203 that moves one or more stoppers 308 along (e.g., linearly along) a body 205 of the valve 206, may selectively allow (e.g., input, place, etc.) high pressure clean fluid 210 provided from a high pressure inlet port 302 to enter a first chamber 202a on a clean side 220a of the piston 204a. The high pressure clean fluid 210 may act on the piston 204a moving the piston 204a in a direction toward the dirty side 221a of the piston 204a and compressing the dirty fluid in the first chamber 202a to produce the high pressure dirty fluid 216. The high pressure dirty fluid 216 may exit the first chamber 202a through the dirty discharge control valve 208a (e.g., outlet valve, high pressure outlet). At substantially the same time, the low pressure dirty fluid 212 may be entering the second chamber 202b through the dirty fill control valve 207b (e.g., inlet valve, low pressure inlet). The low pressure dirty fluid 212 may act on the dirty side 221b of the piston 204b moving the piston 204b in a direction toward the clean side 220b of the piston 204b in the second chamber 202b. The low pressure clean fluid 214 may be discharged (e.g., emptied, expelled, etc.) through the clean control valve 206 as the piston 204b moves in a direction toward the clean side 220b of the piston 204b reducing the space on the clean side 220b of the piston 204b within the second chamber 202b. A cycle of the pressure exchanger is completed once each piston 204a, 204b moves the substantial length (e.g., the majority of the length) of the respective chamber 202a, 202b (which "cycle" may be a half cycle with the piston 204a, 204b moving in one direction along the length of the chamber 202a, 202b and a full cycle includes the piston 204a, 204b moving in the one direction along the length of the chamber 202a, 202b and then moving in the other direction to return to substantially the original position). In some embodiments, only a portion of the length may be utilized (e.g., in reduced capacity situations). Upon the completion of a cycle, the actuation stem 203 of the clean control valve 206 may change positions enabling the high pressure clean fluid 210 to enter the second chamber 202b, thereby changing the second chamber 202b to a high pressure chamber and changing the first chamber 202a to a low pressure chamber and repeating the process.

In some embodiments, each chamber 202a, 202b may have a higher pressure on one side of the pistons 204a, 204b to move the piston in a direction away from the higher pressure. For example, the high pressure chamber may experience pressures between about 8,000 PSI (55,158 kPa) and about 13,000 PSI (89,632 kPa) with the highest pressures being in the high pressure clean fluid 210 to move the piston 204a, 204b away from the high pressure clean fluid 210 compressing and discharging the dirty fluid to produce the high pressure dirty fluid 216. The low pressure chamber 202a, 202b may experience much lower pressures, relatively, with the relatively higher pressures in the currently low pressure chamber 202a, 202b still being adequate enough in the low pressure dirty fluid 212 to move the piston 204a, 204b in a direction away from the low pressure dirty fluid 212 discharging the low pressure clean fluid 214. In some embodiments, the pressure of the low pressure dirty fluid 212 may be between about 100 PSI (689 kPa) and about 700 PSI (4,826 kPa), such as between about 200 PSI (1,379 kPa) and about 500 PSI (3,447 kPa), or between about 300 PSI (2,068 kPa) and about 400 PSI (2758 kPa).

Referring back to FIG. 1, in some embodiments, the system 100 may include an optional device (e.g., a pump) to pressurize the low pressure dirty fluid 212 (e.g., to a pressure level that is suitable to move the piston 204a, 204b toward the clean side) as it is being provided into the chambers 202a, 202b.

Referring again to FIG. 2, if any fluid pushes past the piston 204a, 204b (e.g., leak by, blow by, etc.) it will generally tend to flow from the higher pressure fluid to the lower pressure fluid. The high pressure clean fluid 210 may be maintained at the highest pressure in the system such that the high pressure clean fluid 210 may not generally become substantially contaminated. The low pressure clean fluid 214 may be maintained at the lowest pressure in the system. Therefore, it is possible that the low pressure clean fluid 214 may become contaminated by the low pressure dirty fluid 212. In some embodiments, the low pressure clean fluid 214 may be used to produce the low pressure dirty fluid 212 substantially nullifying any detriment resulting from the contamination. Likewise, any contamination of the high pressure dirty fluid 216 by the high pressure clean fluid 210 would have minimal effect on the high pressure dirty fluid 216.

In some embodiments, the dirty control valves 207a, 207b, 208a, 208b may be check valves (e.g., clack valves, non-return valves, reflux valves, retention valves, or one-way valves). For example, one or more of the dirty control valves 207a, 207b, 208a, 208b may be a ball check valve, diaphragm check valve, swing check valve, tilting disc check valve, clapper valve, stop-check valve, lift-check valve, in-line check valve, duckbill valve, etc. In additional embodiments, one or more of the dirty control valves 207a, 207b, 208a, 208b may be actuated valves (e.g., solenoid valves, pneumatic valves, hydraulic valves, electronic valves, etc.) configured to receive a signal from a controller and open or close responsive the signal.

The dirty control valves 207a, 207b, 208a, 208b may be arranged in opposing configurations such that when the chamber 202a, 202b is in the high pressure configuration the high pressure dirty fluid opens the dirty discharge control valve 208a, 208b while the pressure in the chamber 202a, 202b holds the dirty fill control valve 207a, 207b closed. For example, the dirty discharge control valve 208a, 208b comprises a check valve that opens in a first direction out of the chamber 202a, 202b, while the dirty fill control valve 207a, 207b comprises a check valve that opens in a second, opposing direction into the chamber 202a, 202b.

The dirty discharge control valves 208a, 208b may be connected to a downstream element (e.g., a fluid conduit, a separate or common manifold) such that the high pressure in the downstream element holds the dirty discharge valve 208a, 208b closed in the chamber 202a, 202b that is in the low pressure configuration. Such a configuration enables the low pressure dirty fluid to open the dirty fill control valve 207a, 207b and enter the chamber 202a, 202b.

Figure 3A:
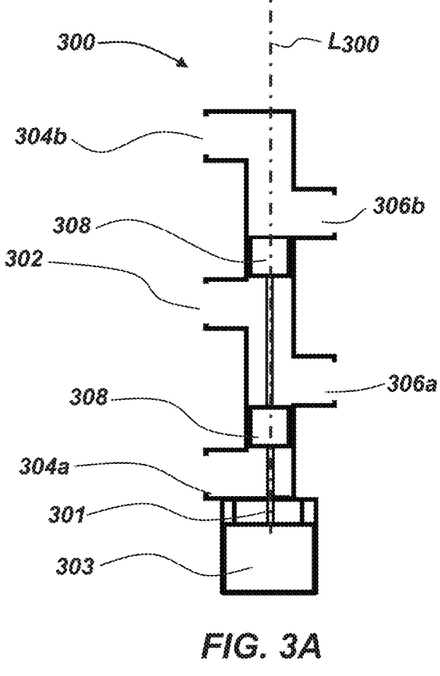
FIG. 3A is a cross-sectional view of a control valve in a first position according to an embodiment of the present disclosure.
Figure 3B:
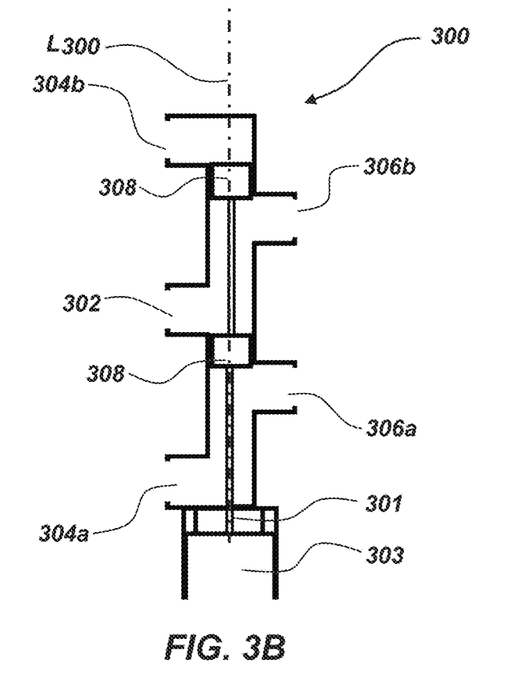
FIG. 3B is a cross-sectional view of a control valve in a second position according to an embodiment of the present disclosure.

FIGS. 3A and 3B illustrate a cross sectional view of an embodiment of a clean control valve 300 at two different positions. In some embodiments, the clean control valve 300 may be similar to the control valve 206 discussed above. The clean control valve 300 may be a multiport valve (e.g., 4 way valve, 5 way valve, LinX® valve, etc.). The clean control valve 300 may have one or more high pressure inlet ports (e.g., one port 302), one or more low pressure outlet ports (e.g., two ports 304a, 304b), and one or more chamber connection ports (e.g., two ports 306a, 306b). The clean control valve 300 may include at least two stoppers 308 (e.g., plugs, pistons, discs, valve members, etc.). In some embodiments, the clean control valve 300 may be a linearly actuated valve. For example, the stoppers 308 may be linearly actuated such that the stoppers 308 move along a substantially straight line (e.g., along a longitudinal axis $L_{300}$ of the clean control valve 300).

The clean control valve 300 may include an actuator 303 configured to actuate the clean control valve 300 (e.g., an actuator coupled to a valve stem 301 of the clean control valve 300). In some embodiments, the actuator 303 may be electronic (e.g., solenoid, rack and pinion, ball screw, segmented spindle, moving coil, etc.), pneumatic (e.g., tie rod cylinders, diaphragm actuators, etc.), or hydraulic. In some embodiments, the actuator 303 may enable the clean control valve 300 to move the valve stem 301 and stoppers 308 at variable rates (e.g., changing speeds, adjustable speeds, etc.).

FIG. 3A illustrates the clean control valve 300 in a first position. In the first position, the stoppers 308 may be positioned such that the high pressure clean fluid may enter the clean control valve 300 through the high pressure inlet port 302 and exit into a first chamber through the chamber connection port 306*a*. In the first position, the low pressure clean fluid may travel through the clean control valve 300 between the chamber connection port 306*b* and the low pressure outlet port 304*b* (e.g., may exit through the low pressure outlet port 304*b*).

FIG. 3B illustrates the clean control valve 300 in a second position. In the second position, the stoppers 308 may be positioned such that the high pressure clean fluid may enter the clean control valve 300 through the high pressure inlet port 302 and exit into a second chamber through the chamber connection port 306*b*. The low pressure clean fluid may travel through the clean control valve 300 between the chamber connection port 306*a* and the low pressure outlet port 304*a* (e.g., may exit through the low pressure outlet port 304*a*).

Now referring to FIGS. 2, 3A, and 3B, the clean control valve 206 is illustrated in the first position with the high pressure inlet port 302 connected to the chamber connection port 306*a* providing high pressure clean fluid to the first chamber 202*a*. Upon completion of the cycle, the clean control valve 206 may move the stoppers 308 to the second position thereby connecting the high pressure inlet port 302 to the second chamber 202*b* through the chamber connection port 306*b*.

In some embodiments, the clean control valve 206 may pass through a substantially fully closed position in the middle portion of a stroke between the first position and the second position. For example, in the first position, the stoppers 308 may maintain a fluid pathway between the high pressure inlet port 302 and the chamber connection port 306*a* and a fluid pathway between the chamber connection port 306*b* and the low pressure outlet port 304*b*. In the second position, the stoppers 308 may maintain a fluid pathway between the high pressure inlet port 302 and the chamber connection port 306*b* and a fluid pathway between the chamber connection port 306*a* and the low pressure outlet port 304*a*. Transitioning between the first and second positions may involve at least substantially closing both fluid pathways to change the connection of the chamber connection port 306*a* from the high pressure inlet port 302 to the low pressure outlet port 304*a* and to change the connection of the chamber connection port 306*b* from the low pressure outlet port 304*b* to the high pressure inlet port 302. The fluid pathways may at least substantially close at a middle portion of the stroke to enable the change of connections. Opening and closing valves, where fluids are operating at high pressures may result in pressure pulsations (e.g., water hammer) that can result in damage to components in the system when high pressure is suddenly introduced or removed from the system. As a result, pressure pulsations may occur in the middle portion of the stroke when the fluid pathways are closing and opening respectively.

In some embodiments, the actuator 303 may be configured to move the stoppers 308 at variable speeds along the stroke of the clean control valve 206. As the stoppers 308 move from the first position to the second position, the stoppers 308 may move at a high rate of speed while traversing a first portion of the stroke that does not involve newly introducing flow from the high pressure inlet port 302 into the chamber connection ports 306*a*, 306*b*. The stoppers 308 may decelerate to a low rate of speed as the stoppers 308 approach a closed position (e.g., when the stoppers 308 block the chamber connection ports 306*a*, 306*b* during the transition between the high pressure inlet port 302 connection and the low pressure outlet port 304*a*, 304*b* connection) at a middle portion of the stroke. The stoppers 308 may continue at a lower rate of speed, as the high pressure inlet port 302 is placed into communication with one of the chamber connection ports 306*a*, 306*b*. After, traversing the chamber connection ports 306*a*, 306*b*, the stoppers 308 may accelerate to another high rate of speed as the stoppers 308 approach the second position. The low rate of speed in the middle portion of the stroke may reduce the speed that the clean control valve 206 opens and closes enabling the clean control valve to gradually introduce and/or remove the high pressure from the chambers 202*a*, 202*b*.

In some embodiments, the motion of the pistons 204*a*, 204*b* may be controlled by regulating the rate of fluid flow (e.g., of the incoming fluid) and/or a pressure differential between the clean side 220*a*, 220*b* of the pistons 204*a*, 204*b*, and the dirty side 221*a*, 221*b* of the pistons 204*a*, 204*b* at least partially with the movement of the clean control valve 206. In some embodiments, it may be desirable for the piston 204*a*, 204*b* in the low pressure chamber 202*a*, 202*b* to move at substantially the same speed as the piston 204*a*, 204*b* in the high pressure chamber 202*a*, 202*b* either by manipulating their pressure differentials in each chamber and/or by controlling the flow rates of the fluid in and out of the chambers 202*a*, 202*b*. However, the piston 204*a*, 204*b* in the low pressure chamber 202*a*, 202*b* may tend to move at a greater speed than the piston 204*a*, 204*b* in the high pressure chamber 202*a*, 202*b*.

In some embodiments, the rate of fluid flow and/or the pressure differential may be varied to control acceleration and deceleration of the pistons 204*a*, 204*b* (e.g., by manipulating and/or varying the stroke of the clean control valve 206 and/or by manipulating the pressure in the fluid streams with one or more pumps). For example, increasing the flow rate and/or the pressure of the high pressure clean fluid 210 when the piston 204*a*, 204*b* is near a clean end 224 of the chamber 202*a*, 202*b* at the beginning of the high pressure stroke may increase the rate of fluid flow and/or the pressure differential in the chamber 202*a*, 202*b*. Increasing the rate of fluid flow and/or the pressure differential may cause the piston 204*a*, 204*b* to accelerate to or move at a faster rate. In another example, the flow rate and/or the pressure of the high pressure clean fluid 210 may be decreased when the piston 204*a*, 204*b* approaches a dirty end 226 of the chamber 202*a*, 202*b* at the end of the high pressure stroke. Decreasing the rate of fluid flow and/or the pressure differential may cause the piston 204*a*, 204*b* to decelerate and/or stop before reaching the dirty end of the respective chamber 202*a*, 202*b*.

Similar control with the stroke of the clean control valve 206 may be utilized to prevent the piston 204*a*, 204*b* from traveling to the furthest extent of the clean end of the chambers 202a, 202b. For example, the clean control valve 206 may close off one of the chamber connection ports 306a, 306b before the piston 204a, 204b contacts the furthest extent of the clean end of the chambers 202a, 202b by preventing any further fluid flow and slowing and/or stopping the piston 204a, 204b. In some embodiments, the clean control valve 206 may open one the chamber connection ports 306a, 306b into communication with the high pressure inlet port 302 before the piston 204a, 204b contacts the furthest extent of the clean end of the chambers 202a, 202b in order to slow, stop, and/or reverse the motion of the piston 204a, 204b.

If the pistons 204a, 204b reach the clean end 224 or dirty end 226 of the respective chambers 202a, 202b the higher pressure fluid may bypass the piston 204a, 204b and mix with the lower pressure fluid. In some embodiments, mixing the fluids may be desirable. For example, if the pistons 204a, 204b reach the dirty end 226 of the respective chambers 202a, 202b during the high pressure stroke, the high pressure clean fluid 210 may bypass the piston 204a, 204b (e.g., by traveling around the piston 204a, 204b or through a valve in the piston 204a, 204b) flushing any residual contaminants from the surfaces of the piston 204a, 204b. In some embodiments, mixing the fluids may be undesirable. For example, if the pistons 204a, 204b reach the clean end 224 of the respective chambers 202a, 202b during the low pressure stroke, the low pressure dirty fluid 212 may bypass the piston 204a, 204b and mix with the low pressure clean fluid contaminating the clean area in the clean control valve 206 with the dirty fluid.

In some embodiments, the system 100 may prevent the pistons 204a, 204b from reaching the clean end 224 of the respective chambers 202a, 202b. For example, the clean control valve 206 may include a control device 209 (e.g., sensor, safety, switch, etc.) to trigger the change in position of the clean control valve 206 on detecting the approach of the piston 204a, 204b to the clean end 224 of the respective chamber 202a, 202b such that the system 100 may utilize the clean control valve 206 to change flow path positions before the piston 204a, 204b reaches the clean end 224 of the chamber 202a, 202b.

In some embodiments, the system 100 may be configured to enable the pistons 204a, 204b to reach the dirty end 226 of the respective chambers 202a, 202b during the high pressure stroke. In some embodiments, the clean control valve 206 may include a control device 209 to trigger the change in position of the clean control valve 206 on detecting the approach of the piston 204a, 204b to the dirty end 226 of the respective chamber 202a, 202b. In some embodiments, the control device may be configured such that the control valve 206 does not complete the change in direction of the piston 204a, 204b until the piston 204a, 204b has reached the furthest extent of the dirty end 226 of the respective chamber 202a, 202b. In some embodiments, the control device may include a time delay through programming or mechanical delay that enables the piston 204a, 204b to reach the furthest extent of the dirty end 226 of the chamber 202a, 202b.

In some embodiments, the system 100 may be configured to enable the pistons 204a, 204b to reach the dirty end 226 of the respective chambers 202a, 202b during the high pressure stroke and prevent the pistons 204a, 204b from reaching the clean end 224 of the respective chambers 202a, 202b during the low pressure stroke. For example, the system 100 may drive both of the pistons 204a, 204b a select distance through the respective chambers 202a, 202b where the pistons 204a, 204b is maintained a select distance from the clean end 224 while enabling the pistons 204a, 204b to travel relatively closer to or come in contact with, the dirty end 226. In some embodiments, the system 100 may be configured such that the pressure differential across the piston 204a, 204b in the low pressure chamber 202a, 202b may be less than the pressure differential across the piston 204a, 204b in the high pressure chamber 202a, 202b such that the piston 204a, 204b travels slower during the low pressure cycle than the high pressure cycle.

In some embodiments, the control device 209 may be configured to trigger the change in position of the clean control valve 206 on detecting the approach of the piston 204a, 204b to the clean end 224 of the respective chamber 202a, 202b such that the clean control valve 206 may change positions before the piston 204a, 204b reaches the clean end 224 of the chamber 202a, 202b. In some embodiments, the control device 209 may be configured to trigger the change in position of the clean control valve 206 on detecting the approach of the piston 204a, 204b to the dirty end 226 of the respective chamber 202a, 202b. In some embodiments, the control device may be configured to trigger the change in position of the clean control valve 206 by evaluating both of the pistons 204a, 204b as they respectively approach the clean end 224 and the dirty end 226 of the chambers 202a, 202b. For example, the control device 209 may detect the approach of the piston 204a, 204b to the dirty end 226 of the chamber 202a, 202b and begin a timer (e.g., mechanical timer, electronic timer, programmed time delay, etc.) If the control device 209 detects the approach of the piston 204a, 204b to the clean end 224 of the chamber 202a, 202b before the time triggers the change in position of the clean control valve 206, the control device 209 may override the timer and change the position of the clean control valve 206 to prevent the piston 204a, 204b from reaching the clean end 224 of the chamber 202a, 202b.

In some embodiments, an automated controller may produce signals that may be transmitted to the clean control valve 206 directing the clean control valve 206 to move from the first position to the second position or from the second position to the first position (e.g., at a constant and/or variable rate).

Referring back to FIG. 2, the pressure exchanger 200 may include one or more bypass features 310 (e.g., in one or more of the chambers 202a, 202b and/or in one or more of the pistons 204a, 204b) for bypassing fluid around and/or through the pistons 204a, 204b. For example, the pistons 204a, 204b may include a bypass feature 310 for enabling fluid to pass through the pistons 204a, 204b. In some embodiments, the bypass feature 310 may be associated with each of the pistons 204a, 204b (e.g., positioned in the pistons 204a, 204b) where the bypass feature 310 comprises a valve, such as a one-way check valve, or another type of suitable valve, such as those listed above, that may limit flow in one or more directions while enabling flow in one or more other directions.

In additional embodiments, the chambers 202a, 202b may define all or a portion of the bypass feature 310. For example, an entirety of the bypass feature 310 may be in the chambers 202a, 202b or may be defined partially by the chambers 202a, 202b and partially by the pistons 204a, 204b.

As discussed above, the system 100 may enable the pistons 204a, 204b to reach an end (e.g., the dirty end 226) of the respective chambers 202a, 202b during a stroke. In such an event, the bypass feature 310 may enable fluid to the pass through the bypass feature 310 in order to reach one or more of the control valves 207a, 207b, 208a, and 208b (e.g., in an underflush in supplying an overflow of high pressure fluid into the chambers 202a, 202b). For example, the system 100 may drive both of the pistons 204a, 204b a select distance through the respective chambers 202a, 202b enabling the pistons 204a, 204b to travel closer to, or come in contact with, the end 226. As the pistons 204a, 204b approach and/or come in contact with the end 226, the bypass feature 310 may be activated (e.g., by the overcoming of a biasing feature) and begin to enable fluid to pass around and/or through the bypass feature 310. For example, the obstruction of the end 226 of the chambers 202a, 202b and/or increasing fluid pressure as the pistons 204a, 204b approach the end 226 may resist further movement of the pistons 204a, 204b, applying an opposing force to the pistons 204a, 204b. As the force of the fluid flow is no longer being substantially utilized to move the pistons 204a, 204, the fluid may then overcome the bypass feature 310 (e.g., when a selected differential pressure is exceeded) in order to enable fluid flow past the pistons 204a, 204b.

Is such an embodiment, the bypass feature 310 may be utilized to over supply fluid (e.g., clean fluid) on one side of the pistons 204a, 204b into the chambers 202a, 202b. The fluid may pass through the bypass feature 310 of the pistons 204a, 204b to another side of the pistons 204a, 204b.

As also discussed above, the system 100 may prevent the pistons 204a, 204b from reaching an end (e.g., the clean end 224) of the respective chambers 202a, 202b during a stroke. However, even if the pistons 204a, 204b approach or reach the end 224, the bypass feature 310 may prevent fluid from passing through the bypass feature 310 in order to, for example, reach one or more of the clean control valve 206 (e.g., in an oversupply of low pressure dirty fluid into the chambers 202a, 202b).

The pistons 204a, 204b (e.g., an outer diameter of the pistons 204a, 204b) may be sized relative to an inner dimension of the chambers 202a, 202b to enable the pistons 204a, 204b to pass through the chambers 202a, 202b without binding while minimizing leakage around the pistons 204a, 204b (e.g., minimizing contamination of the clean fluid). The geometry of pistons 204a, 204b relative to an inner dimension of the chambers 202a, 202b may minimize proppants (e.g., sand) in the dirty fluid from traveling, and becoming trapped, between the pistons 204a, 204b to pass through the chambers 202a, 202b.

In some embodiments, the pistons 204a, 204b may include materials that are abrasion resistant or that include an abrasion resistant coating (e.g., ceramics, carbides, metals, polymers, etc.). In addition, the material of the pistons 204a, 204b may be selected to exhibit a medium density. Such an embodiment may provide at least some buoyancy of the pistons 204a, 204b in fluid, thereby reducing wear on the bottom of the chambers 202a, 202b that may occur due to the gravity of the pistons 204a, 204b.

Figure 4:
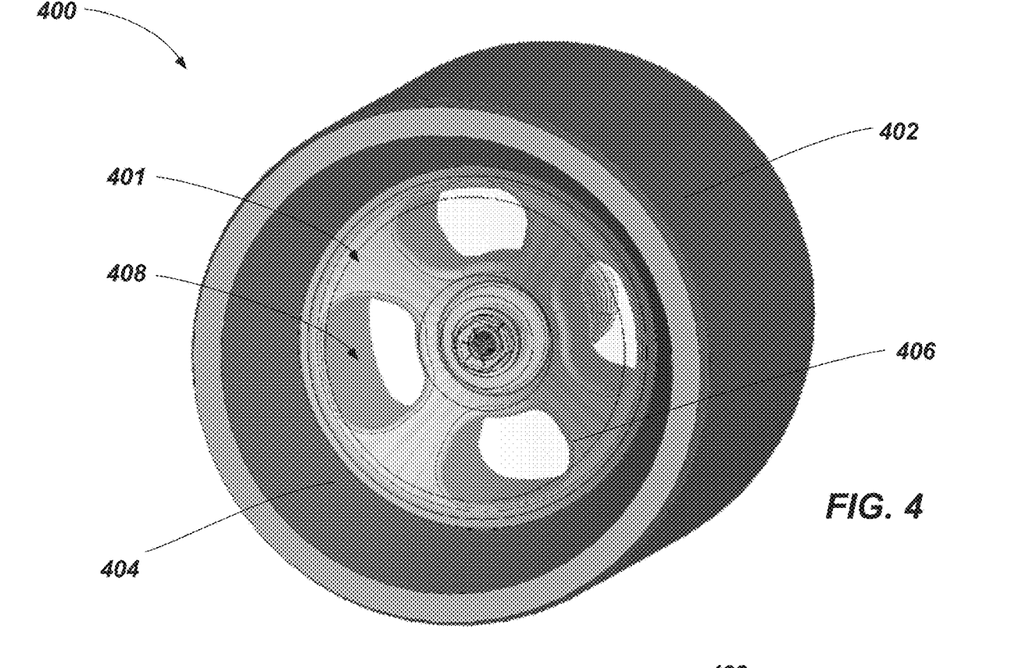
FIG. 4 is a isometric view of a piston according to an embodiment of the present disclosure.

FIG. 4 is an isometric view of a piston 400 with a portion of a bypass feature 401 shown in a transparent view for clarity. In some embodiments, the piston 400 and the bypass feature 401 may be similar to, and include one or more components of, the pistons 204a, 204b and the bypass features 310 discussed above in relation to FIG. 2. As shown in FIG. 4, the piston 400 includes an outer sidewall 402 (e.g., a radial sidewall) defining an outermost extent (e.g., an outer diameter) the piston 400.

The outer sidewall 402 may surround (e.g., encircle) an inner portion of the piston 400 including the bypass feature 401. As depicted, the piston 400 may include a first recess 404 defined in the piston 400 such that the bypass feature 401 is positioned at a central portion 406 of the piston 400 at a base of the recess 404. The central portion 406 of the piston 400 may be defined as a web with openings 408 (e.g., one, two three, four, or more openings or channels through the central portion 406 of the piston 400) that enable fluid to pass through the piston 400 when the bypass feature 401 is an open position enabling fluid flow through the piston 400.

Figure 5:
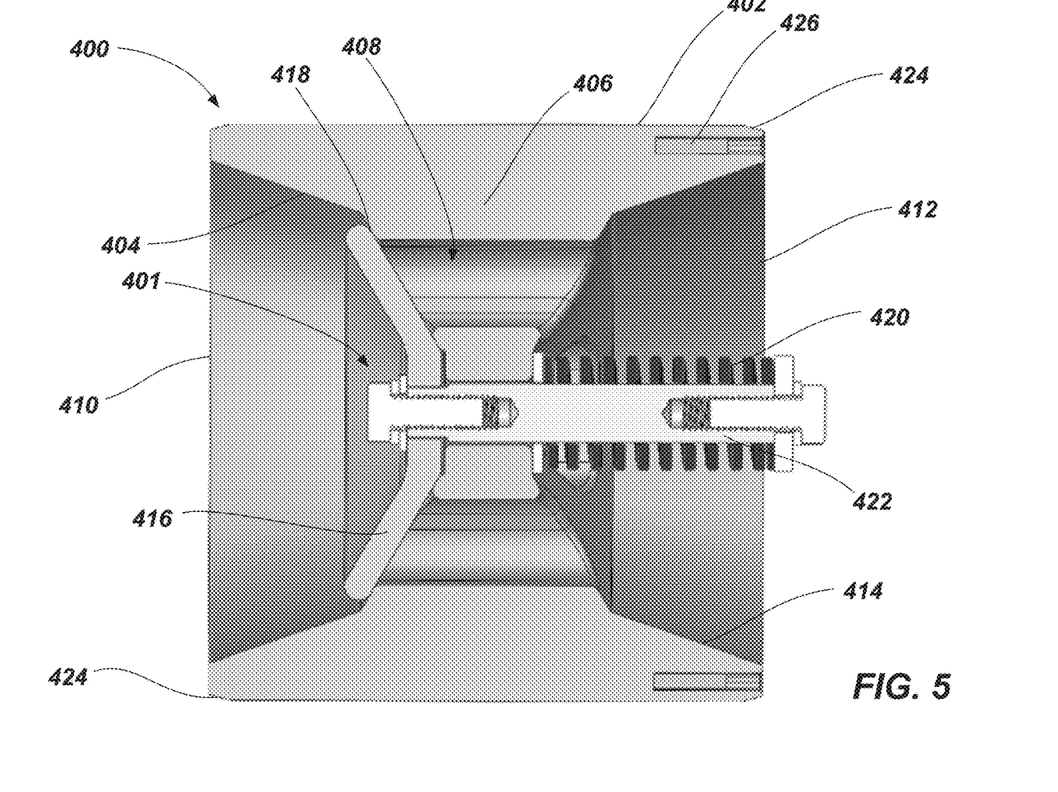
FIG. 5 is a cross-sectional view of a piston according to an embodiment of the present disclosure.

FIG. 5 is a cross-sectional view of a piston (e.g., the piston 400 shown in FIG. 4). As shown in FIG. 5, the piston 400 includes a first axial end 410 and a second, opposing axial end 412. The first recess 404 (e.g., having a cylindrical, conical, or frustoconical shape) may extend from the first axial end 410 into the piston 400 to the central portion 406. A second recess 414 (e.g., having a cylindrical, conical, or frustoconical shape) may extend from the second axial end 412 into the piston 400 to the central portion 406.

The openings 408 at the central portion 406 of the piston 400 may extend between and connect (e.g., place in fluid communication) the first and second recesses 404, 414.

The bypass feature 401 may be positioned at the central portion 406 of the piston 400 between the first and second recesses 404, 414. As depicted, the bypass feature 401 may include a valve member 416 that contacts and defines a seal between a portion of the piston 400 (e.g., a seating portion 418 of the central portion 406) in the first recess 404. As depicted, the bypass feature 401 may comprise a one-way check valve. As noted above, in additional embodiments, the bypass feature 401 may comprise another fluid flow restriction feature, such as, a multiple-way check valve or other type of valve.

In a closed position (e.g., as shown in FIG. 5), the valve member 416 may contact the seating portion 418 and at least partially prevent (e.g., substantially entirely prevent) fluid from passing through the openings 408 to the second recess 414. For example, in the closed position, the valve member 416 may prevent fluid flow from the first axial end 410 to the second axial end 412.

In some embodiments, the valve member 416 may be biased into the closed position. For example, the valve member 416 may be coupled to a biasing feature (e.g., a spring 420, such as, a compression spring, a torsion spring, a Belleville spring, a constant force spring, a extension spring, etc.) on a mounting structure 422 (e.g., a rod coupled to the valve member 416 and the spring 420). The mounting structure 422 may enable the valve member 416 to move (e.g., along an axis of the piston 400) to an open position while compressing the spring 420 under the force of fluid flow from the second axial end 412 to the first axial end 410. When the force of the spring 420 overcomes the force of the fluid flow, the spring 420 may force the valve member 416 back into the closed position.

In the open position, the valve member 416 may move (e.g., axially displace) from the seating portion 418 and enable fluid to pass through the openings 408 from the second recess 414 to the first recess 404. For example, clean fluid may pass from the second axial end 412 to the first axial end 410, which first axial end 410 may be positioned on a dirty side of the piston 400 in communication with a dirty fluid. In embodiments with a biasing feature, movement of the valve member 416 from the seating portion 418 may compress the spring 420.

In some embodiments, the dimension and/or geometry of the piston 400 (e.g., proximate the outermost diameter of the piston 400 may be selected to minimize abrasion of the piston 400 and the chamber 202a, 202b (FIG. 2). For example, the piston 400 may include a chamfered edge or surface 424 (e.g., a chamfered cylindrical wall) at one or both of the first axial end 410 and the second axial end 412.

The chamfered surface 424 may extend from a respective axial end 410, 412 to the outer sidewall 402. As depicted, an entirety of the outermost surface of the piston 400 at both axial ends 410, 412 may comprise an arcuate continuous surface leading from the axial ends 410, 412 to the outer sidewall 402. In some embodiments, the piston 400 including the chamfered surfaces 424 may act to create fluid vortices at the chamfered surfaces 424 (e.g., an interface between the piston 400 and an inner wall of the chamber 202a, 202b) that may suspend particles in the fluid through which the piston 400 is traveling in order to at least partially prevent the particles from becoming wedged between the piston 400 and the chamber 202a, 202b (FIG. 2).

As discussed above, the piston 400 may be utilized in a system (e.g., system 100) that may sense or otherwise monitor the position of the piston 400. In some embodiments, the piston 400 may include one or more position detection features that enable detection of the presence of the piston 400 through, for example, a sensor (e.g., a contact or contactless sensor, such as a magnetic sensor, an optical sensor, an inductive proximity sensors, a Hall Effect sensor, an ultrasonic sensor, a capacitive proximity sensors, a contact, a button, a switch, etc.). For example, the piston 400 may include one or more position detection features comprising one or more magnets 426 (e.g., relatively strong permanent magnets) positioned about the piston 400 (e.g., spaced at intervals about the circumference of the piston 400). The magnetic field produced the magnets 426 may be detected by a complementary sensor (e.g., part of the control system of linear pressure exchanger 200 (FIG. 2)) to determine a position of the piston 400 (e.g., detect the passing of the piston 400 by the sensor).

Pressure exchangers may reduce the amount of wear experienced by high pressure pumps, turbines, and valves in systems with abrasive, caustic, or acidic fluids. The reduced wear may allow the systems to operate for longer periods with less down time resulting in increased revenue or productivity for the systems. Additionally, the repair costs may be reduced as fewer parts may wear out. In operations such as fracking operations, where abrasive fluids are used at high temperatures, repairs and downtime can result in millions of dollars of losses in a single operation. Embodiments of the present disclosure may result in a reduction in wear experienced by the components of systems where abrasive, caustic, or acidic fluids are used at high temperatures. The reduction in wear will result in cost reduction and increased revenue production.

Pistons in accordance with some embodiments of the instant disclosure may act to minimize fluid from one side of the piston (e.g., a fracking fluid) from contaminating fluid (e.g., clean fluid) from the other side of the piston. Further, the piston may enable fluid flow through a valve of the piston to enable fluid in one direction (e.g., enabling clean fluid to flow to a dirty side of the piston) while prohibiting fluid low in another direction (e.g., preventing dirty fluid from traveling to a clean side of the piston). The geometry and/or material of the piston may further reduce abrasion on the piston as it moves through a chamber while minimizing unwanted fluid flow around the piston and particle from becoming stuck around an outer circumference of the piston. Further, the geometry may create fluid vortices that may suspend particles in the fluid through which the piston is traveling in order to at least partially prevent the particles from becoming wedged between the piston and the chamber. Finally, the piston may include one or more features for enabling the detection of the position of the piston.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventors.

What is claimed is:

1. A device for exchanging at least one property between fluids, the device comprising:
    at least one tank comprising:
        a first side for receiving a first fluid with a first property; and
        a second side for receiving a second fluid with a second property; and
    at least one piston in the at least one tank, the at least one piston being independently disposed entirely within the at least one tank and configured to travel unconstrained within the at least one tank, the at leat one piston configured to move freely within the at least one tank based only on a force applied to the at least one piston by at least one of the first fluid or the second fluid within the at least one tank, the at least one piston configured to separate the first fluid from the second fluid, the at least one piston further configured to substantially prohibit the second fluid from traveling from the second side to the first side, wherein the at least one piston is configured to enable the first fluid to travel from the first side to the second side.

2. The device of claim 1, wherein the at least one piston comprises a valve, the valve configured to enable the first fluid to travel from the first side to the second side and to substantially prohibit the second fluid from traveling through the valve from the second side to the first side.

3. The device of claim 1, wherein at least one end of the at least one piston comprises a chamfered edge portion configured to create fluid vortices at an interface between the at least one piston and an inner wall of the at least one tank to minimize particles from entering the interface between the at least one piston and the inner wall of the at least one tank.

4. The device of claim 1, further comprising at least one sensor configured to detect a presence of the at least one piston.

5. The device of claim 1, further comprising at least one magnet positioned at locations about a circumference of the at least one piston, the at least one magnet configured to produce a magnetic field for sensing by an associated sensor.

6. The device of claim 1, wherein the at least one piston is configured to substantially prohibit the second fluid from traveling through the at least one piston from the second side to the first side.

7. The device of claim 1, wherein the at least one piston comprises an abrasion resistant material configured to be at least partially buoyant in at least one of the first fluid or the second fluid.

8. The device of claim 1, further comprising a valve device configured to selectively place the first fluid at a first pressure in communication with the second fluid at a second pressure through the at least one piston in order to pressurize the second fluid to a higher pressure.

9. A system for exchanging pressure between fluids, the system comprising:
- at least one tank comprising:
  - a clean side for receiving a clean fluid at a higher pressure; and
  - a dirty side for receiving a downhole fluid at a lower pressure;
- at least one piston disposed in the at least one tank and configured to travel unconstrained within the at least one tank based only on a force applied to the at least one piston by at least one of the clean fluid or the downhole fluid, the at least one piston configured to separate the clean fluid from the downhole fluid, the at least one piston further configured to at least partially prohibit the downhole fluid from traveling from the dirty side to the clean side; and
- a valve device configured to selectively place the clean fluid at the higher pressure in communication with the downhole fluid at the lower pressure through the at least one piston in order to pressurize the downhole fluid to a second higher pressure.

10. The system of claim 9, wherein the at least one piston is configured to substantially prohibit the downhole fluid from traveling through the at least one piston from the dirty side to the clean side.

11. The system of claim 9, wherein the at least one piston is configured to enable the clean fluid to travel from the clean side to the dirty side.

12. The system of claim 9, wherein the at least one piston comprises a piston valve positioned within the at least one piston, the piston valve configured to enable the clean fluid to travel from the clean side to the dirty side and to substantially prohibit the downhole fluid from traveling through the piston valve from the dirty side to the clean side.

13. The system of claim 9, wherein an outer circumference of the at least one piston comprises a chamfer extending between a first axial end of the at least one piston and a radial side surface of the at least one piston and another chamfer extending between a second axial end of the at least one piston and the radial side surface of the at least one piston.

14. The system of claim 9, wherein an outer circumference of the at least one piston is sized and configured to enable the at least one piston to travel through the at least one tank while at least partially preventing proppants in the downhole fluid from traveling between the outer circumference of the at least one piston and an inner surface of the at least one tank.

15. A piston for at least partially separating at least two fluid streams, the piston comprising:
- a body having an opening extending along an axis of the body, the opening defining a fluid pathway through the piston; and
- at least one valve obstructing the opening, the at least one valve configured to enable fluid flow in one direction along the fluid pathway through the opening and to at least partially inhibit fluid flow in another, opposing direction along the fluid pathway through the opening, wherein the at least one valve comprises a check valve biased in a closed position toward the one direction, wherein the piston comprises an abrasion resistant material configured to be at least partially buoyant in a fluid.

16. The piston of claim 15, wherein the opening defines a first recess on a first end of the body and a second recess on a second end of the body, the first recess and the second recess being separated by the at least one valve.

17. The piston of claim 15, wherein the at least one valve comprises a recess positioned upstream of the check valve.

18. The piston of claim 15, wherein the check valve is configured to move to an open position when a fluid traveling in the one direction overcomes a biasing force of the check valve.

19. A method of operating a pressure exchange device comprising:
- supplying a high pressure fluid to a high pressure inlet of a valve configured to direct flow of the high pressure fluid to a chamber;
- transferring a pressure from the high pressure fluid to a dirty fluid through a piston in the chamber;
- enabling some of the high pressure fluid to pass through the piston; and
- substantially prohibiting the dirty fluid from passing through the piston to the high pressure fluid.

* * * * *